Patented Apr. 13, 1926.

1,580,708

UNITED STATES PATENT OFFICE.

ALOIS ZINKE AND ALFRED PONGRATZ, OF GRATZ, AUSTRIA, ASSIGNORS TO FELICE BEUSA, OF GENOA, ITALY.

PROCESS OF HALOGENIZING PERYLENE.

No Drawing.    Application filed April 7, 1925. Serial No. 21,326.

*To all whom it may concern:*

Be it known that ALOIS ZINKE and ALFRED PONGRATZ, both citizens of the Republic of Austria, residing at Gratz, Styria, Republic of Austria, have invented certain new and useful Improvements in Processes of Halogenizing Perylene, of which the following is a specification.

It has already been proposed to produce halogen derivatives of perylene by direct action of halogens on perylene, but in this way it was impossible to obtain with certainty products of a predetermined composition. The products obtained according to the present invention by the action of halogens in status nascendi on perylene are essentially different from those heretofore known. Moreover, the improved process offers the advantage that the quantity of nascent halogen used may be easily controlled and thereby different substituted halogen perylenes may be obtained.

The following is a description of examples of carrying into practice the improved process.

*Example I.*

1 part by weight of perylene is suspended in 20 parts by weight of glacial acetic acid and 2 parts by weight of sodium bromite are added thereto. Then 1.2 parts by weight of peroxide of hydrogen diluted with glacial acetic acid to 12 parts by weight are added drop by drop in the course of one hour under continuous agitation. At the end of the reaction the product of the latter is deposited in the form of reddish brown flakes, whereupon the product is purified after sucking off by recrystallization from nitrobenzol. The pure product forms yellowish brown laminæ or scales having a bright lustre and a melting point of 222 to 224° centigrade, and is a dibromide derivative. In concentrated sulphuric acid it dissolves with a reddish violet colour. It is insoluble in the cold in water and the usual solvents having a comparatively low boiling temperature, in the usual solvents having a comparatively high boiling temperature it is little soluble in the cold. In the heat it is soluble in xylol, aniline and nitrobenzol.

By brominating perylene by the action of hydrobromic acid on peroxide of hydrogen in a suspension in glacial acetic acid an oxidized brominated product is obtained in the form of a yellow powder which is partly soluble in caustic lyes. By the addition of sodium hydrosulphite a reddish violet vat is obtained in which cotton is dyed in beautiful brown colours.

Furthermore pure perylene chlorides are obtained by causing nascent chlorine to act on perylene in such a manner that the chlorine is obtained by the oxidation of hydrochloric acid with peroxide of hydrogen, and the chlorination is carried out in a suspension of finely powdered perylene in solvents such as glacial acetic acid. By varying the quantity of chlorine, various substituted perylene chlorides may be obtained.

*Example II.*

1 part by weight of perylene is suspended in 20 parts by weight of glacial acetic acid and 4 parts by weight of 40% hydrochloric acid are added. Then the suspension is brought to a temperature of about 80° centigrade and a solution of 1.8 parts by weight of 30% peroxide of hydrogen is caused to gradually flow into the suspension in the course of four hours under agitation. After settling the liquid is decanted and the remainder thereof is separated from the deposit by filtering whereupon the deposit is washed with glacial acetic acid and subsequently with water and is dried.

The compound crystallizes from anilin, nitrobenzol, glacial acetic acid and toluol in yellow needles having a melting temperature of 242° centigrade, in concentrated sulphuric acid it is soluble with a reddish violet colour and according with the results of analysis it is a tetra chlorid of perylene. If in the reaction above described the quantity of peroxide of hydrogen is altered by using for instance a solution of 2.3 parts by weight of 30% peroxide of hydrogen, in ten parts by weight of glacial acetic acid and adding this solution drop by drop to the above suspension a pentachloride of perylene of a melting temperature of 325° centigrade is obtained.

If the quantity of peroxide of hydrogen is reduced to 0.8 parts by weight in 4 parts by weight of glacial acetic acid a product of a melting temperature of 130° centigrade is obtained which according to analysis appears to be a dichlorid of perylene, but which probably is a mixture.

By the action of nascent chlorine obtained by the action of hydrochloric acid on permanganate of potassium or manganese dioxide and the like in the suspension or solution mainly oxidized, chlorinated products which dye cotton yellow to brown from a red vat are formed.

What is claimed is:

A process for manufacturing halogen derivatives of perylene, consisting in suspending perylene in a state of fine subdivision in a liquid and introducing into the same simultaneously and gradually a substance capable of evolving halogen, and an oxidizing agent capable of liberating halogen therefrom; both the said substances and the oxidizing agent being indifferent to perylene and the liquid in which it is suspended.

In testimony whereof we have affixed our signatures.

ALOIS ZINKE.
ALFRED PONGRATZ.